United States Patent [19]

Ver Strate

[11] 4,358,566

[45] Nov. 9, 1982

[54] METHOD FOR CONTROLLING THE FUNCTIONALITY DISTRIBUTION OF LIQUID COPOLYMERS

[75] Inventor: Gary Ver Strate, Matawan, N.J.

[73] Assignee: Exxon Research & Engineering Co., Florham Park, N.J.

[21] Appl. No.: 941,154

[22] Filed: Sep. 11, 1978

Related U.S. Application Data

[63] Continuation of Ser. No. 726,137, Sep. 24, 1976, abandoned.

[51] Int. Cl.$^3$ .......................... C08C 19/02; C08F 8/04
[52] U.S. Cl. .................................... 525/339; 525/338; 525/370; 525/371
[58] Field of Search .................. 526/26; 525/338, 370, 525/371

[56] References Cited

U.S. PATENT DOCUMENTS 3,392,154 7/1968 Baldwin ................................. 526/25
3,459,814 8/1969 Kovach et al. ........................ 526/26

Primary Examiner—William F. Hamrock
Attorney, Agent, or Firm—H. E. Naylor; H. L. Cohen

[57] ABSTRACT

Macromolecules with a distribution of molecular weights and functionality which can be rendered useful by heterogeneous catalytic modification are selectively modified on the basis of molecular dimensions and diffusion rates, using catalysts with specific pore size and particle size distribution. For example, liquid polymers are produced having both hydroxyl and carbonyl functionality with the carbonyl/hydroxyl ratio increasing with molecular weight. More specifically, a high molecular weight polymer is cleaved by ozonation with subsequent reduction with a heterogeneous catalyst having some pores smaller than the radii of gyration of the largest fractions but larger than the radii of gyration of other fractions of the molecular weight distribution of the polymer. The reduction may be performed in an intraparticle mass transfer controlling regime which further influences reduction efficiency as a function of molecular weight. This selectivity is used to narrow or otherwise modify the functionality distribution and make the product generally more useful.

2 Claims, 5 Drawing Figures

Figure 1

PORE VOLUME AND DIAMETER OF SEVERAL HETEROGENEOUS CATALYSTS

Figure 2
MOLECULAR SIZE AND MOLECULAR WEIGHT DISTRIBUTION FOR TYPICAL MACROMOLECULES OF THE INSTANT INVENTION

Figure 3

Figure 4
FUNCTIONALITY DISTRIBUTION BY GPC & UV
OF MACROMOLECULE OBTAINED IN EXAMPLE II

METHOD FOR CONTROLLING THE FUNCTIONALITY DISTRIBUTION OF LIQUID COPOLYMERS

This is a continuation of application Ser. No. 726,137, filed Sept. 24, 1976, now abandoned.

BACKGROUND OF THE INVENTION

This invention relates to the preparation of macroglycols containing a controlled amount of carbonyl groups.

Polyisobutylene macroglycols are well known in the art and are generally produced by oxidizing a high molecular weight polymer and then obtaining complete reduction to hydroxyl functionality. See $\alpha, \omega$-Glycols from Isobutylene and Some Derived Block Copolymers, Journal of Polymer Science: Part A, Vol. 2, pps. 5313–5318 (1961) E. B. Jones and C. S. Marvel. These conventional polyisobutylene macroglycols contain weight average hydroxyl functionality greater than 2 and thus are subject to gellation when reacted with diisocyanates in the preparation of segmented urethanes. This gellation occurs owing to the functionality distribution of the macroglycol which is determined by the distribution of off-chain unsaturation in the parent polymer. That is, if the parent polymer is an isobutylene-isoprene copolymer, the isoprene which is enchained 1,2 or 3,4, as opposed to 1,4 will produce side group functionality after ozonation of the high molecular weight material. The distribution of these side functional groups will be such that the higher the molecular weight molecule, the more functional groups attached thereto.

The use of conventional macroglycol production as discussed above, will therefore lead to a product in which all of the off-chain functionality is completely reduced to hydroxyl functionality or where incomplete reduction is performed there is no variation in completeness with molecular weight—a disadvantage for producing a soluble segmented urethane. The instant invention eliminates this problem by producing a macroglycol in which only a portion of the functionality is completely reduced to hydroxyl functionality, and molecules which would tend to have many hydroxyl groups are the ones selected for incomplete reduction, thus allowing for the production of soluble segmented urethane by subsequent reaction with diisocyanates.

SUMMARY OF THE INVENTION

It has surprisingly been found that the functionality distribution of certain macromolecules, such as isobutylene macromolecules, can be controlled so that only a portion of the functionality of the higher molecular weight fractions is reduced to hydroxyl functionality and all other functionality remains unchanged. This is accomplished by use of a heterogeneous catalyst such as supported Ni having a pore size distribution such that some pores have radii (or diameter) less than the radii of gyration of the largest molecular weight fractions, and furthermore such catalyst may have a particle size which causes the kinetics of the hydrogenation to be in a mass transfer controlled regime which further modifies the functionality distribution. The macroglycols of the instant invention are useful for producing segmented urethanes by subsequent reaction with diisocyanates. These segmented urethanes are in turn useful for coatings, foams and finished goods.

DETAILED DESCRIPTION

In general, polymers suitable for use in the instant invention are those polymers containing functional groups which are capable of being modified by use of a heterogeneous catalyst. These polymers must also have a molecular weight distribution. By functional groups we mean any group which can undergo chemical modification without destroying the polymer backbone. Non-limiting examples of such functional groups are hydroxyl, isocyanato, mercapto, amino, phosphato, carboxyl, carbonyl, sulfonyl, cyanato, isothiocyanato, epoxy, aldehyde, ketone and alkoxy hydroperoxide. Preferred are carbonyl, aldehyde, ketone and alkoxy hydroperoxide functionality. It will also be noted that for purposes of this invention, sites of unsaturation are also considered functional groups.

Generally, these macromolecules are produced by ozonation of a high molecular weight polymer containing functional groups. Starting polymers suitable for use in the instant invention will of course have the same limitations as that of the macromolecules regarding functionality. The term macromolecule as used herein means any polymer having a number average molecular weight, as measured by vapor phase osmometry, of about 200 to 20,000; preferably about 500 to 5,000 and which is subject to the limitations concerning functionality as set forth above.

Non-limiting examples of polymers suitable for use in the instant invention are those polymers as indicated above which are also capable of being oxidized to produce oxygen functionality, which in turn can be reduced to hydroxyl functionality such as ethylene-propylene co- and terpolymers, butyl rubber, polystyrene, natural rubber and polybutadiene. Preferred is butyl rubber and ethylene propylene co-butadiene. Polymers containing amine functionality are also suitable for use. Oxidized polymers may be converted to oximes or hydrazones with subsequent catalytic reduction to amine functionality.

The expression "butyl rubber" as employed in the specification and claims is intended to include copolymers made from a polymerization reacted mixture having therein from about 70 to 99.5% by weight of an isoolefin which has about 4 to 7 carbon atoms, e.g., isobutylene and about 30 to 0.5% by weight of a conjugated multiolefin having from about 4 to 14 carbon atoms, e.g., isoprene. The resulting copolymer contains 85 to 99.5% by weight of combined isoolefin and 0.5 to 15% of combined multiolefin.

Butyl rubber generally has a number average (membrane osmometry) molecular weight of about 20,000 to about 1,500,000, preferably about 25,000 to about 400,000, most preferably about 100,000 to about 400,000; and a mol. % unsaturation of about 1.0 to 50, preferably about 1 to 15. The preparation of butyl rubber is described in U.S. Pat. No. 2,356,128 which is incorporated herein by reference.

For the purposes of this invention, it is preferred that the butyl rubber have incorporated therein from about 0.5 to 8% of combined multiolefin.

It will also be noted that the high molecular weight, high unsaturation butyl type rubbers disclosed in U.S. Pat. Nos. 3,808,177 and 3,856,763 and incorporated herein by reference are also suitable for use in the instant invention.

The term "heterogeneous catalyst" as used in the specification and claims means those catalysts which are insoluble in the reaction medium. Heterogeneous catalysts suitable for use in the instant invention are determined by their intrinsic surface activity for performing the chemistry, their pore size and/or particle size distribution. When the catalyst is chosen for its pore size distribution, the pore size must be such that there are pores having sizes within the range of the radii of gyration of the polymer. Although not wishing to be bound by theory, it is believed that by using a heterogeneous catalyst with a pore size limitation as discussed above, the smaller molecular weight fractions will enter the pores of the catalyst and become completely reduced. Generally, the smaller molecular weight fractions will have functionality only on the ends of its chain, although a portion, as the molecular weight of the fraction increases, will have off-chain functionality as well. As long as the radii of gyration of the low molecular weight fraction is smaller than the average pore size of the catalyst, most functionality (both in and off-chain) will be completely reduced to hydroxy functionality. The larger molecular weight fractions having a larger amount of off-chain functionality and having a radii of gyration in excess of the average pore size of the catalyst will be less able to enter the catalyst pores and will not be completely reduced. Although these larger molecular weight fractions cannot enter the catalyst pores, to the extent small molecules do, they still come in contact with the catalyst leading to reducing of a portion of their functional groups to hydroxyl.

In selecting a particular particle size distribution for the catalyst suitable for use in the instant invention, one must take into consideration the fact that mass transfer may become the rate limiting factor in the execution of a chemical reaction. See "Mass Transfer in Heterogeneous Catalysis" by C. N. Satterfield, MIT Press 1970 incorporated herein by reference. Regardless of the complexity of the particles and their pore size and the kinetics of the reaction, it can be stated that for dilute concentrations, a particle size can be found which will lead to mass transfer controlling the effectiveness ($\eta$) of the catalyst. The effectiveness of the catalyst is defined as the rate at which it performs a reaction relative to that which it would obtain if all the catalyst surface was exposed to reactants with no mass transfer limitations. The effectiveness of the catalyst is a decreasing function of the Thiele Modulus $\Phi$ which is related as follows:

$$\Phi \approx L(k/D)^{\frac{1}{2}}$$

where L is a measure of the size of the particle, k is the first order (pseudo if need be) rate constant at the surface and D is the diffusion coefficient of the molecule in the particle. When $\Phi$ is large $\eta \sim 1/\Phi$.

To operate where mass transfer effects are of a given importance the particle size need only be made large enough to obtain a given $\Phi$ and thus the desired effectiveness. For purposes of this invention, a particle size should be selected that will produce a Thiele Modulus from about 0.01 to 1000, preferably about 0.05 to 500, more preferably about 0.1 to 20. Once operation in this range is achieved, the diffusion coefficients of the macromolecules, which vary with molecular weight over the range of the molecular weight distribution of the sample, will determine the effectiveness with which a particular molecular weight molecule will be transported to the catalyst surface to undergo reaction. For example, if one is operating in a strongly diffusion controlled regime, $\eta \alpha D^{\frac{1}{2}}$. For macromolecules in dilute solution $D \alpha k M^{-\frac{1}{2}}$ thus $\eta \alpha M^{-\frac{1}{4}}$. Therefore, the catalyst particle size can produce a molecular weight effect. This effect will occur simultaneously with the pore exclusion effect.

Upon cleaving, by ozonation, a high molecular weight parent polymer such as an isobutylene-isoprene copolymer, carbonyl functionality will appear on the ends of the segments where in-chain unsaturation existed. Carbonyl functionality will appear as side groups where off-chain unsaturation existed. It is the chains with side group carbonyl functionality which must undergo controlled reduction so that not all of the carbonyl groups are reduced to hydroxyl groups. The distribution of 1,2 and 3,4 units will almost invariably be such that more of these groups will be present in the high molecular weight fractions of the macromolecule. (See Table I below). This is so since all units of isoprene, 1,4 and 1,2 or 3,4 will have been approximately distributed according to independent most probable distributions.

The 1,4 enchained isoprene will produce a most probable distribution of molecular weight for the macromolecule, while the 1,2 and 3,4 enchained isoprene unit distribution will be superimposed on that, with the high molecular weight fractions receiving a larger number of side groups. That is, the average number of 1,2 or 3,4 units per isobutylene will be constant with molecular weight; therefore, chains with more isobutylene will have more 1,2 or 3,4 isoprene units or more off-chain functionality.

TABLE I

| EXPECTED FUNCTIONALITY DISTRIBUTION |
|---|
| Isoprene Content 5 Mole % |

Isoprene Butyl is a "copolymer" of 1,4; 1,2; 3,4 and "other" structures.
1,2 and 3,4 enchained isoprene gives macromolecules with >2 functional groups/molecule.
20% non 1,4 $\bar{f}n$ should be ~2.25, $\bar{f}n$ is number average functionality
On average, bigger molecules have more groups/molecule.

| $\bar{M}n$ | $\bar{f}n$ |
|---|---|
| 500 | 2.08 |
| 1,000 | 2.16 |
| 1,500 | 2.25 |
| 5,000 | 2.80 |
| 10,000 | 3.60 |

Gel points go as $\bar{f}w$, weight average functionality, weighted towards highly functional molecules.

The macroglycols of the instant invention may be produced by first preparing a cement containing about 0.01 to 30 wt. % of initial high $\bar{M}n$ polymer, about 99.99 to 70 wt. % substantially inert hydrocarbon or chlorinated solvent, and about 0.1 to 10 wt. % $C_1$ to $C_8$ aliphatic alcohol or polyol. The cement is cooled to about −90° C. to 10° C. preferably −40° C. to 0° C. and a mixture of oxygen, air, or a blend of $O_3/N_2$ containing about 1 to 10 volume % ozone is passed through the solution until the olefin is quantitatively consumed. No ozone in excess of that needed to consume the olefin is added. The solution is purged with a substantially inert gas such as nitrogen for about 0.1 to 20 minutes to remove the oxygen. The solution is pumped at a temperature of about 0° to 23° C. into a bed packed with supported Ni catalyst pellets wherein the catalyst pellets were originally activated in a stream of hydrogen at about 400° C. The bed is pressurized to about 50 to 2000 psi with hydrogen and allowed to react for a residence time of about 0.01 to 4 hours. After the reaction period, the solution in the first vessel passes to a second vessel which is also packed with supported catalyst at about 100° to 200° C., preferably 1000 psi. Residence time in this second vessel is also about 0.01 to 4 hours. It will be noted that the instant invention can also be carried out in a fluidized bed, stirred autoclave or reactor bomb.

Non-limiting examples of metals other than Ni that are suitable for use in the instant invention when on the proper support include Pd, Pt, and Cu chromite.

There are a variety of porous structures which may be used as support for the active metal catalyst component. In some cases, the entire substrate can be active such as the acid catalysis performed by molecular sieves. See Satterfield, Ibid.

For the particular materials suitable for use in the instant invention, for example, Ni on silica or alumina, pore size distribution data may be obtained by mercury porisimetry. Data for three typical catalysts appears in FIG. 1 which illustrates that the pores can cover various size ranges and have different distribution breadth.

Figure 2:
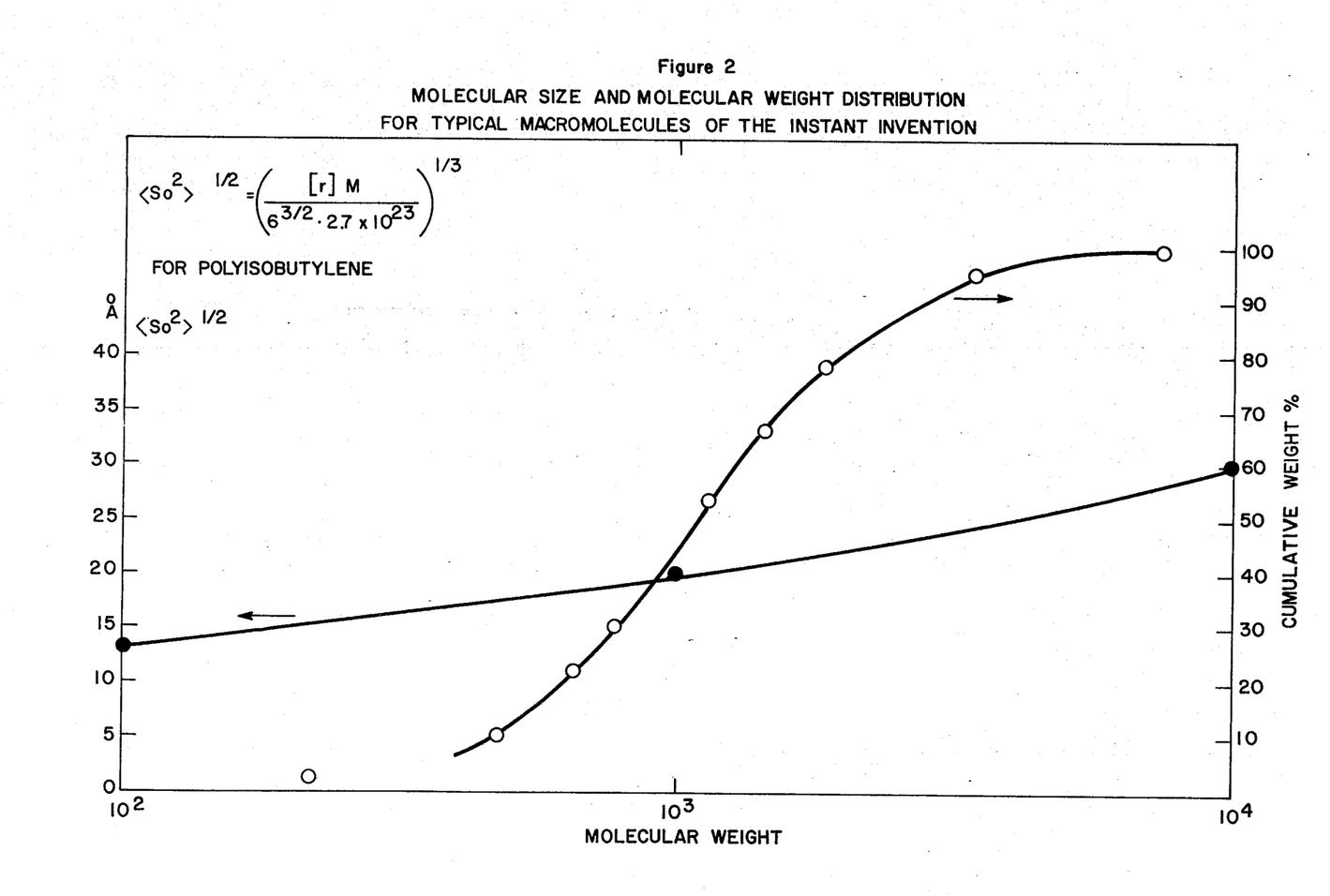
FIG. 2 shows molecular size and molecular weight distribution for a typical polymer suitable for use in the instant invention.

By comparison the polymer molecules upon which chemical modifications are performed have molecular weights and dimensions (radius of gyration $<So^2>^{\frac{1}{2}}$) in the range shown in FIG. 2. A variety of data currently exist which demonstrates the pore exclusion effects encountered by molecules of this size when partitioned over pores of the size shown in FIG. 2. These data are presented in *Macromolecules*, 9, 182, (1976); E. Casassa.

That intraparticle diffusion effects exist for the process under consideration here is shown in Example 9.

The number of functional groups/molecule and the distribution of functional groups/molecule over the molecular weight distribution of the polymer can be determined by two methods.

The first method consists of analyzing, either the whole polymer or fractions obtained therefrom (by solvent-nonsolvent precipitation) by wet chemical methods, infrared spectroscopy and VPO number average molecular weight. The fractions are obtained by extracting about 20 grams of the whole polymer with about 150 cc of acetone. This produces a lower molecular weight fraction comprising about 10–20% by weight of the whole polymer. The remaining polymer is dissolved in dichloromethane and methanol is added to precipitate about 10% of the polymer. These fractions are analyzed for hydroxyl content by phthalic anhydride esterification and for carbonyl content by infrared spectroscopy. The infrared technique is calibrated by model compounds (esters, ketones) or forming the phenyl-hydrazones from the carbonyl units on the polymer and analyzing for nitrogen.

The second method is used only for hydroxyl group analysis. The macroglycol is first reacted with phenylisocyanate thereby converting the hydroxyl groups to a urethane structure which is active to ultraviolet light. The modified macroglycol is then passed through a gel permeation chromatograph and the "counts" are analyzed for ultraviolet absorbance, thus providing a continuous measure of hydroxyl functionality/molecular weight.

Figure 5:
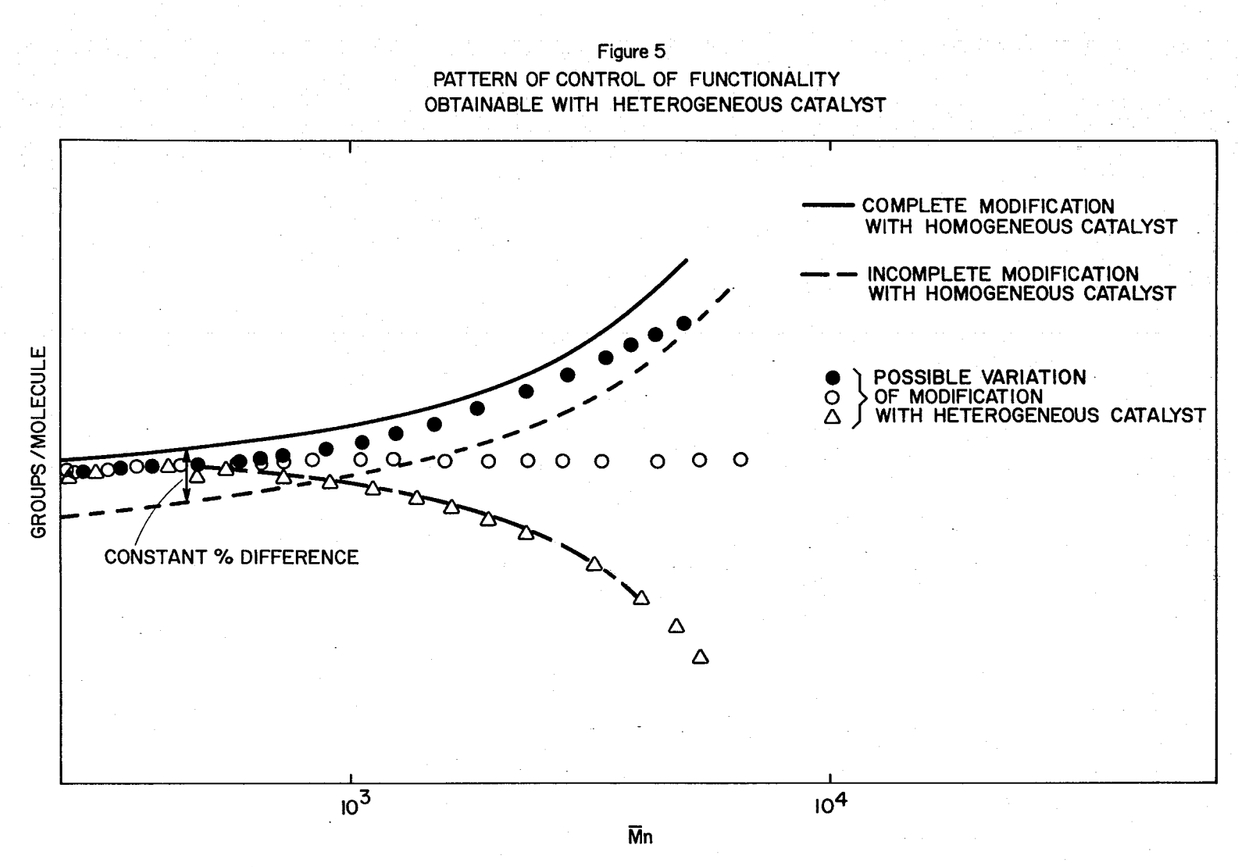
FIG. 5 shows the possible patterns of control of functionality obtainable with the method of instant invention.

The following examples will demonstrate the pattern of chemical modification control of a polymer which can be obtained by use of the instant invention. The concept of chemical modification control is shown in FIG. 5. The shape of the functionality/molecule curve will not change by incomplete homogeneous catalytic modification. For example, if the modification by homogeneous catalysis is 10 percent incomplete at the low molecular end of the molecular weight distribution of the resulting polymer, it will also be 10 percent incomplete at the high molecular wt. end of the molecular weight distribution. With the heterogeneous catalyst however, it is possible to completely reduce the low molecular weight fractions while selecting the degree of reduction for the remainder of the fractions by regulating the pore size distribution and/or particle size. Thus any shape distribution which falls below complete reduction and represents monotonously decreasing effectiveness with molecular weight can be envisioned.

EXAMPLE 1

1500 cc of a 20 weight percent (polymer) hexane solution of an isoprene isobutylene copolymer containing 5 mole percent isoprene and having an Mn of 90,000 was contacted with 1 volume % $O_3$ in $O_2$ gas mixture at 0° C. until the olefin was exactly and quantitatively consumed. The solution was purged with nitrogen and then reacted with 25 g of $LiAlH_4$ which had been dissolved in 500 cc of diethyl ether. The polymer solution was added dropwise to the hydride keeping the temperature below 30° C. The reaction proceeded for 48 hours at which time the batch was hydrolyzed with 15% NaOH and washed with $H_2O$. The solvent (hexane) was stripped by stirring the macroglycol at 100° C. in a stream of nitrogen.

The resulting polymer was analyzed and $1.46 \times 10^{-3}$ moles OH/gm was found. Infrared analyses showed no absorption in the 1700–1750 $cm^{-1}$ in excess for that observed for nonfunctional polyisobutylene. Number average Mw by VPO was 1580 yielding a number average functionality $\bar{f}n=2.3$.

EXAMPLE 2

The resulting polymer of Example 1 was reacted with varying amounts of methylene diisocyanate by heating a known amount of said polymer to 80° C. e.g., 3.00 g and then hand stirring it in known amounts of methylene diisocyanate. After the isocyanate was thoroughly mixed, the reactants were cooled to 23° C. and ca 0.020 g dibutyltindilaurate was added to catalyze the reaction. After 24 hours, infrared, analyses were performed on the products and the results are shown in Table 2 below. Note that gel is formed over a range of isocyanate levels owing to the fact that the weight average degree of functionality (fw) is greater than 2.

EXAMPLE 3

The resulting polymer of Example 1 was also reacted with dipropylene glycol and methylene diisocyanate to form a segmented urethane. 20.0 g of said polymer was mixed with 11.0 g methylene diisocyanate (MDI) and 3.60 g dipropylene glycol (DPG). After mixing at 80° C., the viscous solution was compression molded at 23° C. and then reacted at 110° C. for 24 hours. The tough product was placed in pyridine (a good solvent for uncrosslinked materials of this composition); the sample did not dissolve. Furthermore, the sample cannot be repressed into a new shape without degradation owing to the crosslinking.

stage was at 140° C. and 1000 psi. Residence time in the first stage was about 90 minutes and about 270 minutes in the second stage. The catalyst is a 10-60 mesh particle size Girdler 87RS which was activated by passing a stream of $H_2$ over it at 350°-400° C. for 2 hours.

The resulting polymer was isolated from the solvent by stripping under nitrogen at 100° C. and contained about $1.35 \times 10^{-3}$ moles OH/gm, and had a number average molecular weight of 1430 which yields an $\bar{f}n$ of 2.0.

TABLE 2

| Example 2 Run | g Polymer | g Methylene Diisocyanate | Ratio NCO:OH i.r.[1] | OH Anal.[2] | i.r.[3] | Gel Content[4] % |
|---|---|---|---|---|---|---|
| 1 | 3.0 ± .03 | .527 | .91 | .96 | NO | >60 |
| 2 | 3.0 ± .03 | .549 | .95 | 1.1 | NO | >48 |
| 3 | 3.0 ± .03 | .571 | .98 | 1.04 | NO | >20 |
| 4 | 3.0 ± .03 | .594 | 1.02 | 1.08 | YES | >66 |

[1]Calculated based on observed equivilance point by NCO presence at end of reaction as determined by i.r.
[2]Calculated based on OH analyses by phthalic anhydride esterification.
[3]Infrared determination of presence of NCO at end of reaction.
[4]Determined in tetrahydrofuran. Gels poorly defined and only minimum values could be determined.

EXAMPLE 4

A sample of the resulting polymers of Example 1 was fractionated according to the solvent-nonsolvent procedure discussed above and the results are illustrated in Table 3 which shows hydroxyl/molecule increasing with molecular weight and the presence of polymer with more than 2 hydroxyl/molecules for the LiAlH₄ produced polymer. It is the presence of these molecules which causes the weight average functionality to be >2 and also causes gellation of the polymer when reacted to produce urethanes.

The following demonstrates by use of heterogeneous catalysis, the shape of the functionality distribution can be changed and a macroglycol which is suitable for thermoplastic urethane formation can be prepared. One can perform incomplete reductions using the hydride or other homogeneous catalytic processes as in Example 1 and get $\bar{f}w$ below 2. However, to do this, $\bar{f}n$ must be lowered to a point where the properties of the urethanes produced would suffer. Only through use of the heterogeneous catalyst can the functionality distribution be narrowed or biased to reduce the number of highly functional molecules.

EXAMPLE 5

A solution such as that of Example 1, with the exception that 2 weight percent methanol is added, is ozonized to quantitatively consume the olefin at −20° C. No excess ozone was added. The alcohol was added to cleave the initial ozone olefin adduct to produce aldehyde, ketone and alkoxy hydroperoxide groups. This solution was then pumped through a two stage hydrogenation unit. The first stage is maintained at 30° C. and 1000 psig and saturated with $H_2$ whereas the second

EXAMPLE 6

The resulting polymer of Example 5 was reacted with various amounts of methylene diisocyanate as in Example 1. The NCO:OH ratio varied from 0.9 to 1.2:1. Infrared analyses indicated NCO in excess at the end of the reaction for those samples where NCO:OH was calculated to exceed 1. In no case was gel formed, all products were soluble in 90% hexane 10% pyridine. The fact that no gel is formed with difunctional coupling agents means that $\bar{f}w$ is $\leq 2$.

EXAMPLE 7

The resulting polymer of Example 5 was also reacted to form a segmented urethane with DPG and MDI as in Example 3. The product was soluble in pyridine and may be refabricated.

Three samples of the polymer of Example 5 were fractionated by the solvent-nonsolvent technique as in Example 1. Data appears in Table 3 and FIG. 3. It is noted that whereas OH functionality/molecule increases with molecular weight for the hydride prepared product, it decreases for the catalytically produced product. The high molecular weight-potentially high functionality molecules have preferentially been left unreduced, thus, the ratio of carbonyl to hydroxyl increases with molecular weight.

EXAMPLE 8

In this and subsequent examples, a base isoprene isobutylene copolymer of somewhat lower isoprene content (3.8 percent) with a $\bar{M}n$ of 90,000 was employed according to the procedure in Example 1, thus, overall functionality/molecule was lower.

TABLE 3

FUNCTIONALITY DISTRIBUTION SOLVENT-NONSOLVENT FRACTIONATION

| Sample | Method of Reduction | Fraction | Weight % | Infrared Absorbance Ratio $\left(\frac{\text{Carbonyl 1710 cm}^{-1}}{\text{Hydroxyl 3340 cm}^{-1}}\right)$ | $\bar{M}n$ | Phthalic Anhydride OH/gm moles × 10³ | Hydroxyl Molecule ± 10% |
|---|---|---|---|---|---|---|---|
| Example 4 | LiAlH₄ | Whole | — | 0. | 1580 | 1.46 | 2.3 |
| | | Low MW | 24.3 | 0. | 840 | 2.9 | 2.4 |
| | | High MW | 7.1 | 0. | 5500 | .52 | 2.75 |

TABLE 3-continued
FUNCTIONALITY DISTRIBUTION SOLVENT-NONSOLVENT FRACTIONATION

| Sample | Method of Reduction | Fraction | Weight % | Infrared Absorbance Ratio $\left(\frac{\text{Carbonyl } 1710 \text{ cm}^{-1}}{\text{Hydroxyl } 3340 \text{ cm}^{-1}}\right)$ | $\overline{M}n$ | Phthalic Anhydride OH/gm moles × $10^3$ | Hydroxyl Molecule ± 10% |
|---|---|---|---|---|---|---|---|
| Example 7 | Girdler 87 RS | Whole | — | .30 | 1450 | 1.35 | 1.95 |
|  |  | Low MW | 29.3 | .29 | 870 | 2.51 | 2.2 |
|  |  | High MW | 4.3 | 1.09 | 4900 | .27 | 1.3 |
| Example 7 Run 2 & 3 (averaged) | Girdler 87 RS | Whole | — |  | 1490 | 1.35 | 2.0 |
|  |  | Low MW | 18. | .43 | 715 | 2.7 | 2.1 |
|  |  | High MW | 7. | .90 | 3450 | .5 | 1.7 |

This example demonstrates that when the resulting macroglycol is prepared using metal hydride reduction but leaving carbonyl functionality in the polymer that there is no preferential bias to leaving the carbonyl in the high MW portions of the product and functionality/molecule increases with molecular weight.

The resulting polymer was ozonized and reduced as in Example 1.

TABLE 4
FUNCTIONALITY DISTRIBUTION SOLVENT-NONSOLVENT FRACTIONATION

| Sample |  |  | Weight % | Moles OH/g | VPO $\overline{M}n$ | % Functionality Ketone | Moles $\left(\frac{\text{Carbonyl}}{\text{Hydroxyl}}\right)$ Arbitrary units | OH/molecule |
|---|---|---|---|---|---|---|---|---|
| Example 8 | Metal Hydride Reduction | Original | — | $10.9 \times 10^{-4}$ |  |  |  |  |
|  |  | Low MW Cut | 10% | $2.5 \times 10^{-3}$ | 840 | ~4 | .13 | 2.1 |
|  |  | High MW Cut | Ca 10% | $6.2 \times 10^{-4}$ | 3900–5500 | <3 | .03 | 2.8 |
|  | Heterogeneous Catalytic Reduction | Original | — | $10.5 \times 10^{-4}$ |  |  |  |  |
|  |  | Low MW Cut | 17% | $2.5 \times 10^{-3}$ | 860 | ~4 | .12 | 2.1 |
|  |  | High MW Cut | 13% | $3.8 \times 10^{-4}$ | 4780 | ~19 | .3 | 1.8 |

Total groups/molecule including unreduced C = O is ca. 2.2.

Figure 3:
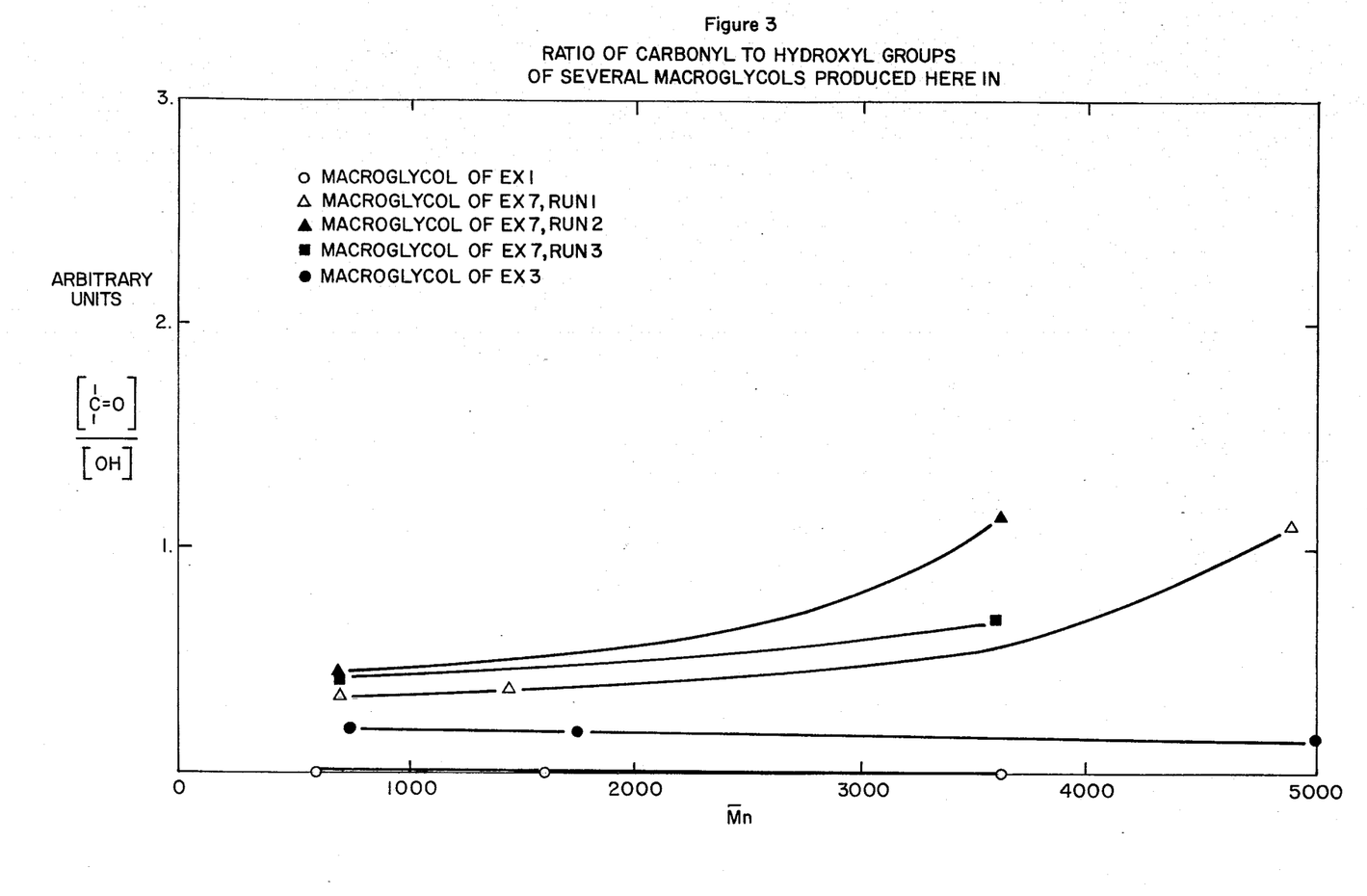
FIG. 3 shows the ratio of carbonyl groups to hydroxyl groups as a function of molecular weight of the resulting macromolecule obtained in Example 7 of the instant application.

The polymer was fractionated as in Example 4 yielding the characteristics shown in Table 4 and FIG. 3.

The polymer gelled when reacted 1:1 with methylene diisocyanate.

EXAMPLE 9

In this experiment the effect of particle size of the catalyst on the reduction rate is demonstrated. An isoprene-isobutylene copolymer containing 3.8 percent isoprene and having an $\overline{M}n$ of 90,000 was ozonized as described above and 2 l. of solution was transferred to a 3 l. pressure vessel which contained a volume fraction of catalyst equal to about 0.1. The catalyst was contained in a stainless steel basket and the entire vessel was agitated in a rocking motion at 1 cycle/sec.

The reduction rate was followed by disappearance of carbonyl absorption in the infrared at 1710 cm$^{-1}$. The difference in reduction rate when two catalyst particle sizes were used is as follows:

| Catalyst Run | HARSHAW 0104T Particle Size | 25g loading/3 l. vessel Reduction Rate |
|---|---|---|
| 1 | .31 cm (length and diameter) | $1.5 \times 10^{-9}$ moles sec. cc catalyst |
| 2 | .20 → .08 | $3.3 \times 10^{-9}$ |
|  | (irregular shapes crushed from the tablets of run 1) |  |

Thus, a reduction in particle size by a factor of approximately 2 has produced an increase in reduction rate of a factor of 2.1. Such profound effects of particle size are found only in the range where effectiveness factors are proportional to the reciprocal of the particle size and the square root of the diffusion coefficient of the molecule.

Once it is demonstrated that one is operating in a strongly diffusion controlled regime, the relative differences expected in reduction efficiency owing to different diffusion coefficients as a function of molecular weight can be calculated.

$$\eta = 3/\Phi = 1/R \sqrt{\frac{D}{k}}$$

$$= 1/R \left(\frac{1}{kk'M^{\frac{1}{2}}}\right)^{\frac{1}{2}}$$

if dilute solutions relationships hold where $\Phi$ is the Thiele modulus, R is a measure of the size of the particle, k is the first order rate constant at the surface, D is the diffusion coefficient, M is the molecular weight and $D = k'M^{-\frac{1}{2}}$.

We may assign effectiveness factors for the differing molecular weights as follows:

| M | A . η (A is a constant) |
|---|---|
| 500 | 1 |
| 1,000 | 0.84 |
| 2,000 | 0.71 |
| 5,000 | 0.56 |
| 10,000 | 0.47 |

By comparing the reduction efficiencies above with the efficiency of reduction as determined by hydroxyl content of the fractions appearing in Table 3, we see that the basic decrease in reduction effectiveness is caused by the dependence of the diffusion coefficient of the macromolecule on its molecular weight. Variation in pore size and its distribution will cause perturbations about this general trend owing to pore exclusion effects.

EXAMPLE 10

The following examples show how the characteristics of the polymer vary with respect to the pore size of the catalyst. In separate experiments, solutions of 13 weight percent polymer in 96% hexane 4% methanol were ozonized at ca −40° C. to quantitatively consume the olefin. The feedstock polymer was the same as in Example 8.

Figure 1:
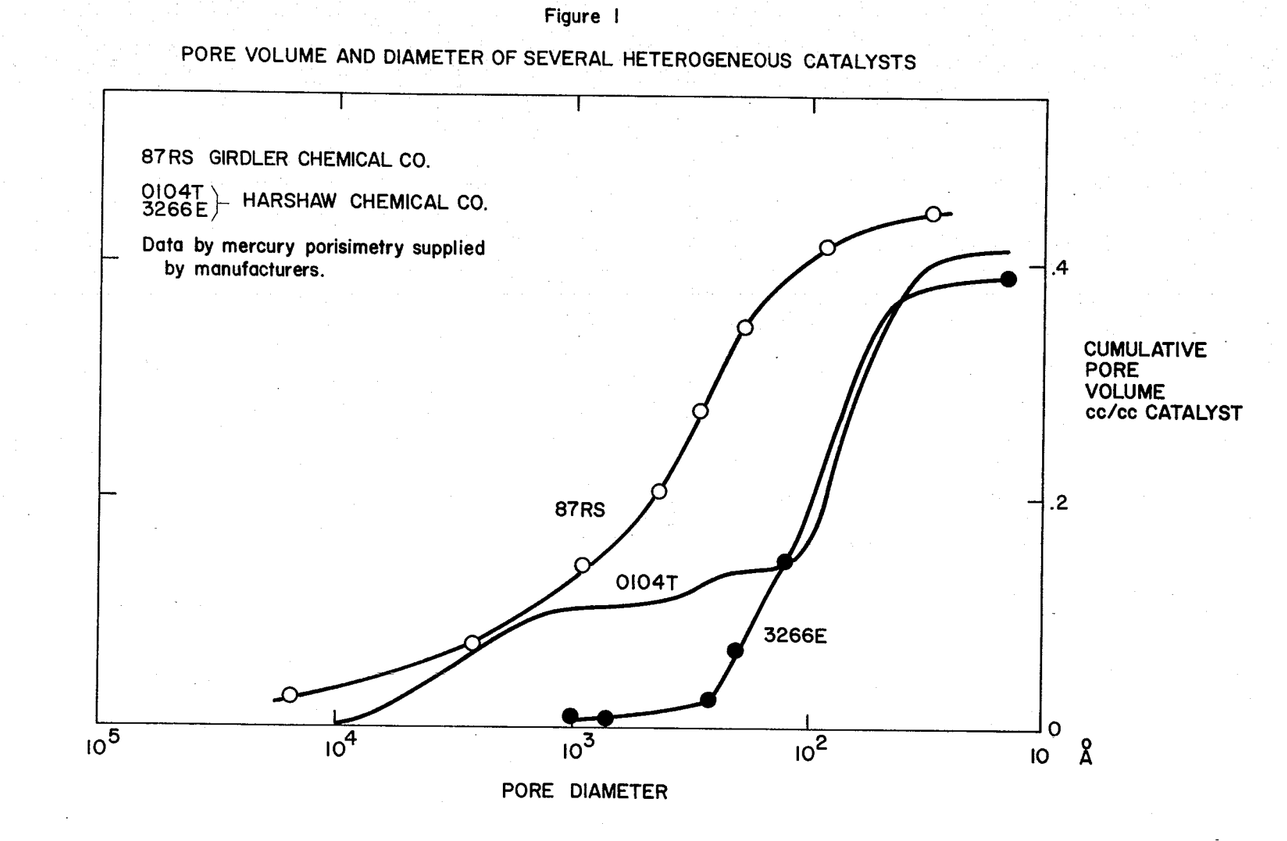
FIG. 1 shows pore volume and diameter ranges for several typical heterogeneous catalysts available commercially.

These solutions were contacted separately with 25 g. of a 10–20 mesh particle size sample of the supported nickel catalysts of FIG. 1. In these batch operations, the catalyst is contained in a basket and the entire reaction vessel is rocked to provide contacting of the catalyst and polymer solution. Reaction is carried out in a 3 l. vessel for 95 hours at 23° C. and 1,000 psi, after which the vessel was heated to 135° C. where it was maintained for another 150 hours. The product was removed from the vessel; hexane and methanol were removed by stirring in a stream of nitrogen at 100° C. for 90 minutes.

These samples were fractionated by the solvent-nonsolvent procedure. In addition, one sample was reacted with phenylisocyanate and the isocyanate/molecule was monitored as a function of MW by ultraviolet detection on a gel permeation chromatograph (GPC). Data appear in Table 5 for the solvent-nonsolvent fractionation and in FIG. 4 for the GPC results.

Figure 4:
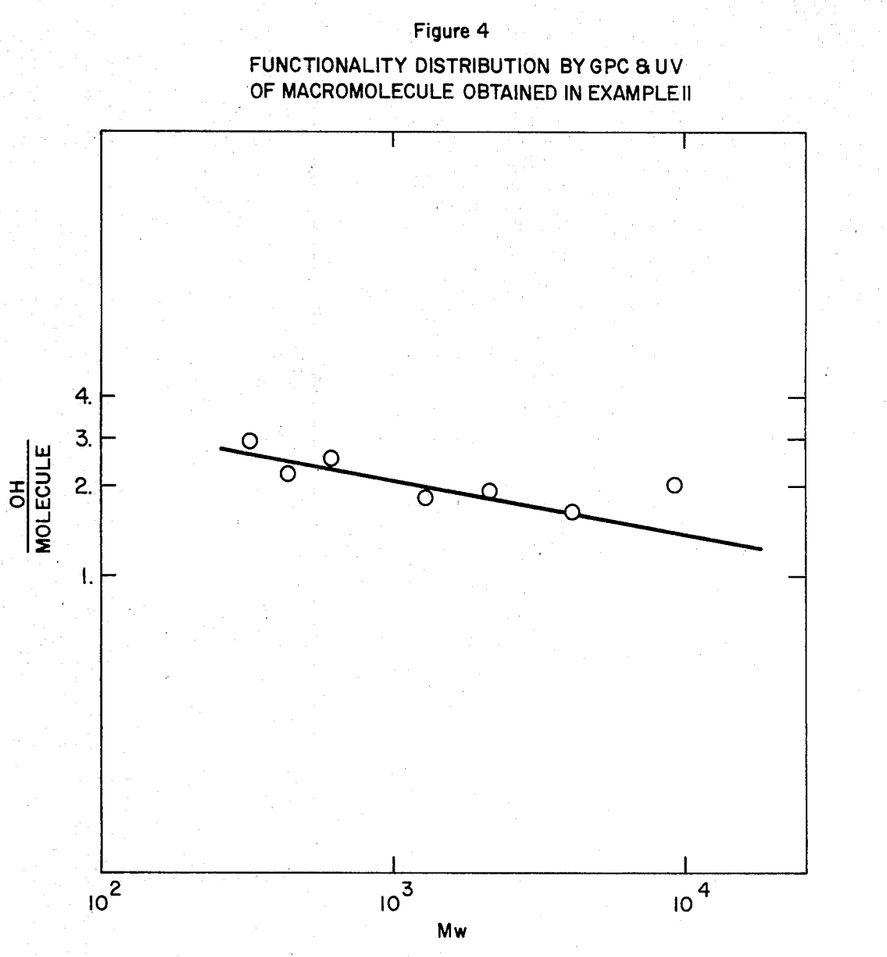
FIG. 4 shows the functionality distribution of the macromolecules obtained in Example 11 of the instant application.

It is noted that the qualitative results of the GPC and solvent-nonsolvent fractionations are similar for the catalytically produced macroglycol, hydroxyl/molecule decreases with increasing molecular weight. Determination of the extinction coefficients and their dependence on concentration precludes making more rigorous statements from the GPC data.

Table 5 illustrates that regardless of the catalysts used, the hydroxyl/molecule distribution is modified over that produced homogeneously.

The three samples in Table 5 when fractionated yield low MW fractions which comprise approximately equal weight fractions of similar MW and hydroxyl content. Thus, we may say that the catalytic reduction was performed until the low MW portions of the molecular weight distribution were nearly equally (completely) converted (±5%) to —OH from carbonyl. The high molecular weight fractions are significantly different in their degree of reduction, however. Run 2 has some 100% more OH/molecule and approximately one half the carbonyl to hydroxyl ratio in the infrared as compared to Run 1 or Run 3. Furthermore, it is noted from FIG. 1 that the 87RS catalyst from which Run 2 was prepared has a significantly larger number of large pores than the other two catalysts. Although all we need show is that differences are produced, we can suggest that the reasons for the differences in reduction efficiency of the high molecular weight components are caused by differences in pore size among the catalysts. Furthermore, it appears that those catalysts which have fewer large pores (e.g., 3266E) cause a sharper reduction in OH/molecule than do those with larger pores (e.g., 87 RS).

The effects of diffusion are superimposed on these exclusion effects.

TABLE 5

| | Catalyst | Fraction | Weight % | $\overline{M}n$ | Infrared Carbonyl 1710 cm$^{-1}$ Hydroxyl 3430 cm$^{-1}$ | Moles[1] OH/g × 10$^4$ | hydroxyl molecule |
|---|---|---|---|---|---|---|---|
| Run 1 | 0104T | Whole Polymer | | (1900) | 1.02 | 9.56 | 1.8 |
| | 10–20 Mesh | Low $\overline{M}n$ | 13.7 | (870) | .63 | 21.8 | 1.9 |
| | Particles | Intermediate $\overline{M}n$ | 15.2 | 4300 | 3.7 | (1.0) | .43 |
| | | High $\overline{M}n$ | 8.8 | (5600) | 3.05 | { .92 (1.2) } | .56 |
| Run 2 | 87RS | Whole | | (1900) | .22 | 11.4 | 2.16 |
| | 10–20 Mesh | Low $\overline{M}n$ | 13.1 | (870) | .20 | 22.9 | 2.00 |
| | Particles | Intermediate $\overline{M}n$ | 14.3 | 4300 | .94 | 2.8 | 1.2 |
| | | High $\overline{M}n$ | 8.1 | (5600) | 1.53 | { 2.1 (1.8) } | 1.1 |
| Run 3 | 3266E | Whole | | 1850 | .65 | 8.8 | 1.62 |
| | 10–20 Mesh | Low $\overline{M}n$ | 12.6 | 870 | .51 | 20.5 | 1.78 |
| | Particles | Intermediate $\overline{M}n$ | 14.7 | (4300) | 2.7 | 1.4 | .60 |
| | | High $\overline{M}n$ | 13.7 | 5600 | 2.3 | { 1.0 (.8) } | .56 |

[1]Values in parenthesis ( ) represent infrared determinations.

What is claimed is:

1. A process for controlling the functionality of a macromolecule having a number average molecular weight from about 200 to 20,000 and having functional groups capable of being modified by a heterogeneous catalyst, which comprises modifying the functionality of said macromolecule with a heterogeneous catalyst wherein said catalyst has an average pore size smaller than the radii of gyration of the largest macromolecule fractions in that the smaller molecules enter the pores of the catalyst and their functional groups are modified and the larger molecules are less able to enter the catalyst pores and are not completely modified therein and wherein said functional groups are aldehyde, ketone and alkoxy hydroperoxides.

2. A process for controlling the functionality of a macromolecule having a number average molecular weight from about 200 to 20,000 and having functional groups capable of being modified by a heterogeneous catalyst, which comprises modifying the functionality of said macromolecule with a heterogeneous catalyst wherein said catalyst has an average pore size smaller than the radii of gyration of the largest macromolecule fractions in that the smaller molecules enter the pores of the catalyst and their functional groups are modified and the larger molecules are less able to enter the catalyst pores and are not completely modified therein and wherein said functional group is carbonyl.

* * * * *